R. A. BAILEY.
AUTOMOBILE HEATER.
APPLICATION FILED NOV. 26, 1913.

1,173,637.

Patented Feb. 29, 1916.
2 SHEETS—SHEET 1.

WITNESSES

INVENTOR

R. A. BAILEY.
AUTOMOBILE HEATER.
APPLICATION FILED NOV. 26, 1913.

1,173,637. Patented Feb. 29, 1916.
2 SHEETS—SHEET 2.

WITNESSES
N. T. Holman
R. D. Little

INVENTOR
R. A. Bailey
by Luthrine Beet & Fuller
his Attorneys

UNITED STATES PATENT OFFICE.

REGINALD A. BAILEY, OF NEW CASTLE, PENNSYLVANIA.

AUTOMOBILE-HEATER.

1,173,637.  Specification of Letters Patent.  Patented Feb. 29, 1916.

Application filed November 26, 1913. Serial No. 803,216.

*To all whom it may concern:*

Be it known that I, REGINALD A. BAILEY, a citizen of the United States, residing at New Castle, in the county of Lawrence and State of Pennsylvania, have invented a new and useful Automobile-Heater, of which the following is a specification.

My invention relates to apparatus for heating the interior of automobiles, and more particularly to apparatus in which the heated exhaust gases or products of combustion from the automobile engine are utilized in heating air and the heated air is conducted to the interior of the automobile.

One object of my invention is to provide a heater of novel construction having improved means whereby the efficiency of the heating apparatus is increased and a circulation of the heated air is established and maintained through the air chamber of the heating apparatus.

Another object of my invention is to provide an automobile heater having improved means whereby the interior of the air chamber is readily cleaned, and the removal of mud and dirt from the air chamber of the heater is facilitated.

A further object of this invention is to provide an automobile heating apparatus having improved means for regulating and controlling the flow of heated gases into and through the gas chamber of the apparatus.

Still further objects of the invention will become apparent hereinafter as the invention is more fully described in the specification and pointed out in the appended claims.

Figure 1:
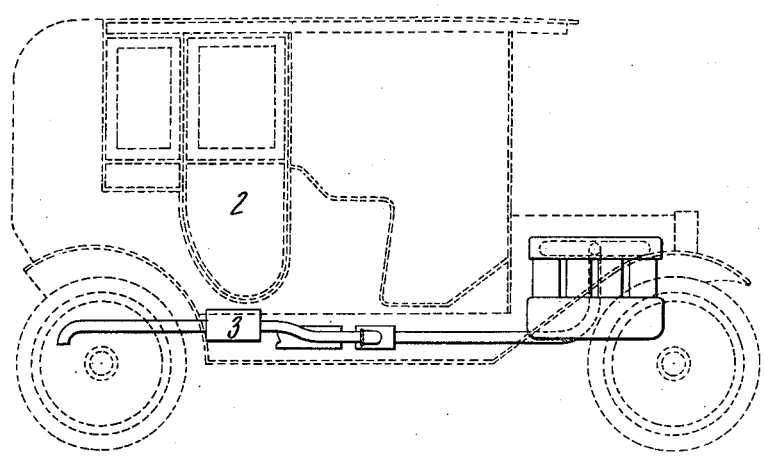
Figure 2:
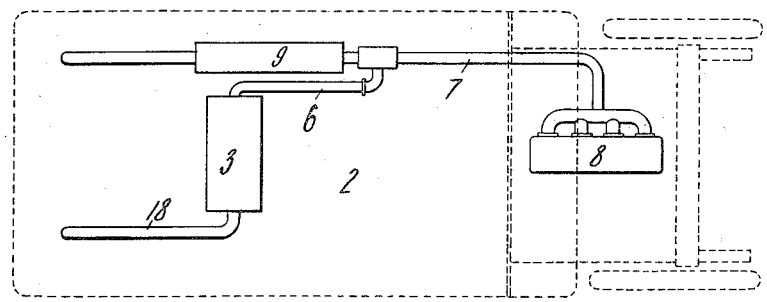
Figure 9:
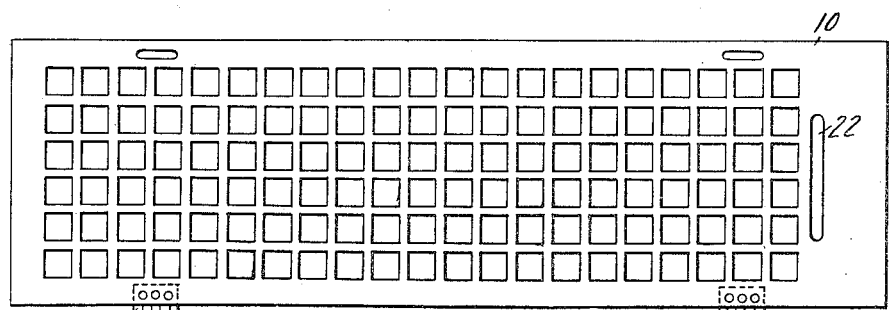
Figure 3:
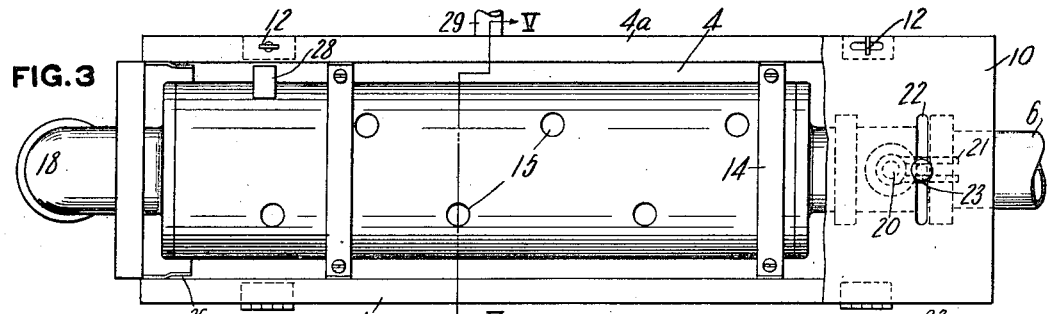
Figure 4:
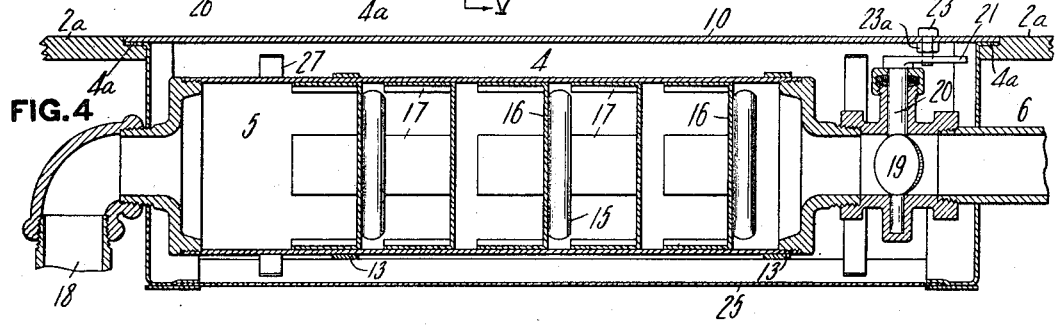
Figure 5:
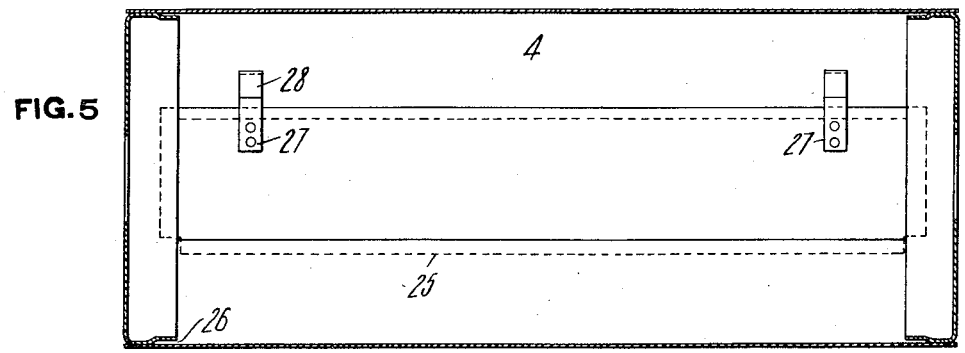
Figure 6:
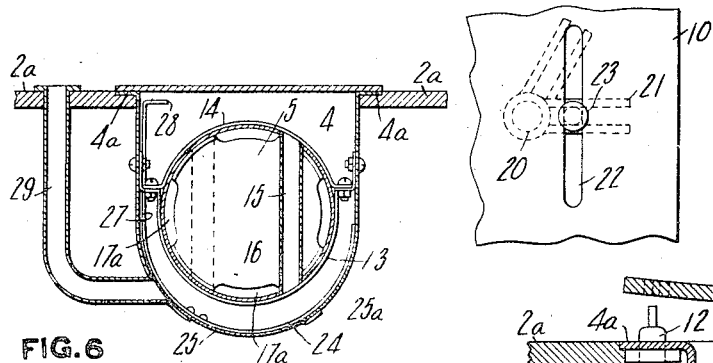
Figure 7:
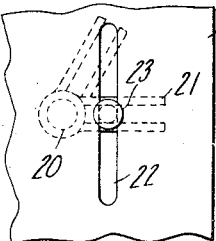
Figure 8:
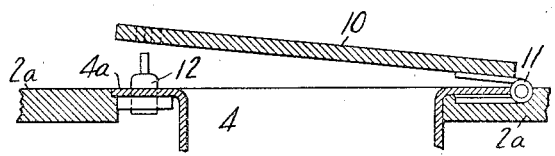

Referring to the drawings forming part of this invention, Figure 1 is a side elevation showing an automobile having a heater mounted or secured thereon as constructed and arranged in accordance with my invention. Fig. 2 is a plan of the apparatus of Fig. 1. Fig. 3 is a plan on a larger scale, of the heater shown in Figs. 1 and 2. Fig. 4 is a sectional side elevation of the heater forming a novel part of this invention. Fig. 5 is a sectional plan of the box forming the air chamber of the heater, showing the construction of the cleaning door in the bottom of this chamber. Fig. 6 is a transverse section of the heater, the section being taken on the line V—V of Fig. 3, showing the arrangement of the circulating tubes forming a novel feature of this invention. Fig. 7 is a detail plan showing the construction of the valve operating mechanism. Fig. 8 is a sectional end elevation showing the manner of securing the hinged cover plate to the open uppermost side of the air chamber of the heater. Fig. 9 is a plan of the hinged cover plate for the air chamber of the heater.

In the accompanying drawings, the numeral 2 designates an automobile having a heater 3 secured in the bottom or floor of the automobile body. The heater 3 comprises an air chamber 4 and a tubular gas chamber 5, the inlet pipe 6 leading to the chamber 5 being connected to the engine exhaust pipe 7 at a point between the exhaust ports of the engine 8 and the muffler 9 on the end of the exhaust pipe 7.

As will be seen by reference to Figs. 3, 4, 5 and 6, the air chamber 4 consists of a sheet metal box having vertical ends and vertical sides connected by an integrally formed semi-cylindrical bottom and having an open top side, the top side of the chamber 4 having outwardly projecting flanged edges 4ª to which a perforated top cover plate 10 is secured by hinges 11 and securing thumb bolts 12. The cover plate 10 is provided with a series of perforations so as to permit the heated air to rise upwardly in the air chamber 4 and pass through the perforations into the interior of the automobile 2. The heater is positioned in the automobile so as to bring the cover plate flush with the upper surface of the floor 2ª of the automobile. An air pipe 29 connects by its upper end into the automobile body, and its lower end opens into the bottom of the air chamber 4, this pipe serving to supply air to the bottom of the chamber 4 and create a circulation through the automobile body, pipe 29 and air heating chamber 4.

Suspended within the air chamber 4 is the tubular gas chamber 5, the straps 13, 13, fastened to the sides of the air chamber 4 being employed to maintain the tubular gas chamber 5 axially central therein and the removable straps 14, 14, serving to detachably fasten the chamber 6 in place on the straps 13.

Secured in the tubular gas chamber 5, at intervals in the length thereof, is a series of transversely, and preferably vertically, extending air tubes 15, these tubes having ends opening into the air chamber 4, and positioned in the chamber 5 between at least part of the transversely extending tubes 15, which are staggered with relation to the axial center of the chamber 5, are baffles 16, as will be seen by reference to Fig. 4.

The baffles 16 have a series of flanges 17 on the peripheries thereof, which normally spring outwardly into close engagement with the wall of the gas chamber 5 so as to assist in maintaining the baffles in position in the chamber, and a series of recesses or slots 17a are formed on the periphery of the baffles between the flanges 16 to provide a series of passages through which the heated gases flow from one side to the other of the baffles 16 in passing through the gas chamber 5.

The exhaust end of the tubular gas chamber 5 is provided with an exhaust pipe 18 which projects through the end of the air chamber 4 and discharges into the atmosphere, and the inlet pipe 7 on the inlet end of the gas chamber 5 is provided with a valve 19 located inside the air chamber and preferably of the butterfly type, by which the supply of heated exhaust gases to the chamber 5 is regulated and controlled. The valve 19 has an upwardly projecting stem 20 and on the end of this stem is an operating lever 21 having a slotted outer end.

The hinged cover plate or lid 10 on the upper side of the air chamber 4 has a transverse slot 22 in one end thereof, and extending through this slot is a button-headed pin or bolt 23. The shank of the pin 23 is screw threaded and a nut 23a thereon forms a convenient means for securing the pin in position while permitting it to be moved manually from end to end of the slot 22.

The lower end of the pin 23 projects downwardly into the slot in the end of the valve lever 21 when the cover plate is in closed position, so as to be operatively connected to the lever 17 on the stem of the butterfly valve 16 and cause the valve 19 to open and close by sliding the button-headed pin 23 in the slot 22.

When the fastening bolts 12 are removed and the cover plate 10 is swung backwardly on its hinges, the pin 23 is lifted out of the slot in the lever 21 which remains in fixed position on the cover plate, so that when the cover plate is again moved into closed position the pin 23 will again project into the slot in the end of the valve lever 21 and become operatively connected thereto.

The semi-cylindrical bottom of the air chamber 4 is provided with an opening 24 which normally is closed by means of the curved door or cover plate 25. The ends of this cover plate 25 enter the guide slots 26, 26, formed in the chamber 4 at the ends of the opening 24, and the plate has a lip 25a on one side edge which overlaps the adjacent edge of the opening 24 in the chamber bottom when the cover plate is in closed position. Fastened to the opposite side edge of the cover plate 25 are straps 27 which extend upwardly within the chamber 4 and have hooked upper ends 28 by which the cover plate 25 is moved from the interior of the automobile in opening and closing the opening 24 so as to permit of removal of accumulations of mud or dirt from the air chamber 4.

In the operation of my improved apparatus, which is intended for use in cold weather, the parts are assembled as shown. When it is desired to use the heater, the valve 19 is opened to the desired extent by manually moving the button-headed pin 23 in the slot 22 of the cover plate 10 of the heater. A part of the heated exhaust gases ordinarily passing through the exhaust pipe 7 into and through the muffler 9 and into the atmosphere will then pass through the gas chamber 5 of the heater, and in passing through the gas chamber will heat the surrounding air in the air chamber 5.

Owing to the currents of air passing through the transversely extending tubes 15 in the gas chamber 5, by which the heating surface of the gas chamber is materially increased without increasing the diameter or length of the heater, the heating effect is greatly increased. The heated air rises upwardly in the air chamber, as well as through the open ended circulating tubes 15, and, passing through the perforations in the cover plate 10, emerge into and heat the interior of the automobile body.

By closing the valve 19 on the inlet pipe leading to the gas chamber of the heater, the heater is rendered inoperative, and in such case all of the heated gases are caused to pass through the muffler 9 in the ordinary manner.

When, as will be the case, mud and dirt collect in the heater, being deposited thereon from the feet of occupants of the automobile, and it becomes necessary or desirable to clean the interior of the box forming the air chamber 4, after loosening and lifting the cover plate 10 of the heater and then shifting the sliding cover plate 25 in the bottom of the box by means of the hooks 28 on the upper ends of the straps 27 to uncover the opening 24, the dirt collected in the box will be discharged therefrom. The cover plate 25 is then moved into its closing position and the hinged cover plate 10 is again secured in closed position, in which it remains until it is again desirable or necessary to inspect or clean the interior of the air chamber.

The advantages of my invention will be apparent to those skilled in the art. By the use of the transversely extending tubes in the gas chamber of the heating apparatus, the heating surface of the apparatus is materially increased, the circulation of the air is made more effective, and the operation and control of the apparatus are simplified.

By providing the cleaning opening in the bottom of the heater, cleaning of the apparatus is more readily accomplished and cleaning thereof from within the automobile is made possible.

The use of the slotted valve lever and button-headed valve operating pin affords ready means for detachably connecting the valve lever in the interior of the heater and permits of its operation from the outside of the closed heater.

Modifications in the construction and arrangement of the parts may be made without departing from my invention as defined in the appended claims.

I claim:—

1. An automobile heater comprising a hollow gas chamber, an air chamber surrounding the gas chamber having an open top side, a hinged cover plate for said open top side having perforations therein opening into the interior of the automobile, a transversely extending slot in said cover plate, means for conducting heated waste gases from the automobile engine through the gas chamber, a valve for controlling the flow of heated gases into the gas chamber having a slotted operating lever, and a pin slidingly fastened in the slot of the cover plate and projecting into the slot in said valve lever to operatively connect the valve with the exterior of the air chamber.

2. An automobile heater comprising a hollow gas chamber, an air chamber surrounding the gas chamber having an open end in the plane of the floor of the automobile, a hinged cover plate closing the open upper end of the air chamber having a series of perforations therein, a cleaning opening in the bottom of said air chamber, a sliding cover normally closing said cleaning opening, straps extending upwardly within the air chamber having hooked upper ends, for opening and closing the cleaning opening from the interior of the automobile when the hinged cover plate is open.

In testimony whereof, I have hereunto set my hand.

REGINALD A. BAILEY.

Witnesses:
J. L. TREFALLEN, Jr.,
R. D. LITTLE.